United States Patent
Tsubota et al.

(10) Patent No.: US 11,185,924 B2
(45) Date of Patent: Nov. 30, 2021

(54) METAL POWDER, METHOD OF PRODUCING ADDITIVELY-MANUFACTURED ARTICLE, AND ADDITIVELY-MANUFACTURED ARTICLE

(71) Applicants: DAIHEN CORPORATION, Osaka (JP); FUKUDA METAL FOIL & POWDER CO., LTD., Kyoto (JP)

(72) Inventors: Ryusuke Tsubota, Osaka (JP); Junichi Tanaka, Osaka (JP); Yohei Oka, Osaka (JP); Akira Okamoto, Osaka (JP); Masato Kikukawa, Kyoto (JP); Hiroaki Okubo, Kyoto (JP); Yoshito Nishizawa, Kyoto (JP); Takeshi Maruyama, Kyoto (JP); Motonori Nishida, Kyoto (JP)

(73) Assignees: DAIHEN CORPORATION, Osaka (JP); FUKUDA METAL FOIL & POWDER CO., LTD., Osaka (JP)

( * ) Notice: Subject to any disclaimer, the term of this patent is extended or adjusted under 35 U.S.C. 154(b) by 0 days.

(21) Appl. No.: 16/268,691

(22) Filed: Feb. 6, 2019

(65) Prior Publication Data

US 2019/0168302 A1 Jun. 6, 2019

Related U.S. Application Data

(62) Division of application No. 15/379,621, filed on Dec. 15, 2016, now abandoned.

(30) Foreign Application Priority Data

Dec. 25, 2015 (JP) .................................. 2015-254077

(51) Int. Cl.
*B22F 10/20* (2021.01)
*C22C 1/04* (2006.01)
(Continued)

(52) U.S. Cl.
CPC ............ *B22F 10/20* (2021.01); *B22F 1/0003* (2013.01); *B22F 10/00* (2021.01); *B33Y 10/00* (2014.12);
(Continued)

(58) Field of Classification Search
CPC .. B22F 3/1055; B22F 1/0003; B22F 2998/10; B22F 2301/10; B22F 2301/052;
(Continued)

(56) References Cited

U.S. PATENT DOCUMENTS 3,779,714 A * 12/1973 Nadkarni ............. C22C 1/1078
75/234
5,640,667 A * 6/1997 Freitag .................. B22F 3/1266
419/31
(Continued)

FOREIGN PATENT DOCUMENTS

| CN | 1907602 A | 2/2007 |
| CN | 101815799 A | 8/2010 |

(Continued)

OTHER PUBLICATIONS

Communication dated May 14, 2019, from the Japanese Patent Office in counterpart Application No. 2015-254077.
(Continued)

*Primary Examiner* — John A Hevey
(74) *Attorney, Agent, or Firm* — Sughrue Mion, PLLC (57) ABSTRACT

A metal powder for additive manufacturing includes: not less than 0.2 mass % and not more than 1.3 mass % of aluminum; and a balance including copper and an incidental impurity.

2 Claims, 8 Drawing Sheets (51) Int. Cl.
*B22F 10/00* (2021.01)
*B33Y 10/00* (2015.01)
*B33Y 80/00* (2015.01)
*B22F 1/00* (2006.01)
*C22C 9/01* (2006.01)
*C22F 1/08* (2006.01)
*B22F 3/24* (2006.01)
*B33Y 70/00* (2020.01)

(52) U.S. Cl.
CPC ............ *B33Y 70/00* (2014.12); *B33Y 80/00* (2014.12); *C22C 1/0425* (2013.01); *C22C 9/01* (2013.01); *C22F 1/08* (2013.01); *B22F 2003/248* (2013.01); *B22F 2301/052* (2013.01); *B22F 2301/10* (2013.01); *B22F 2998/10* (2013.01); *Y02P 10/25* (2015.11)

(58) Field of Classification Search
CPC ........ B22F 2003/248; B22F 3/24; C22F 1/08; C22C 9/01; C22C 1/0425; B33Y 80/00; B33Y 70/00; B33Y 10/00; Y02P 10/295
See application file for complete search history.

(56) References Cited

U.S. PATENT DOCUMENTS

| | | | |
|---|---|---|---|
| 2011/0031448 A1* | 2/2011 | Ota | H01B 1/22 252/512 |
| 2012/0125670 A1 | 5/2012 | Kato et al. | |
| 2014/0053956 A1* | 2/2014 | Etter | B22F 3/24 148/522 |
| 2015/0273631 A1* | 10/2015 | Kenney | B33Y 50/00 419/53 |
| 2016/0074942 A1* | 3/2016 | Fang | B22F 9/04 419/32 |
| 2016/0089859 A1* | 3/2016 | Lacy | B32B 15/01 428/596 |
| 2016/0332227 A1* | 11/2016 | Tsubota | B22F 1/0003 |
| 2018/0111199 A1* | 4/2018 | Tsubota | C22C 9/06 |

FOREIGN PATENT DOCUMENTS

| | | |
|---|---|---|
| CN | 102470438 A | 5/2012 |
| CN | 104404509 A | 3/2015 |
| CN | 104439997 A | 3/2015 |
| DE | 102010029078 A1 | 11/2011 |
| EP | 2463046 A1 | 6/2012 |
| JP | 2007-051322 A | 3/2007 |
| JP | 2009-235556 A | 10/2009 |
| JP | 4400696 B2 | 1/2010 |
| JP | 2011-021218 A | 2/2011 |
| JP | 2011-34894 A | 2/2011 |
| JP | 2016-53198 A | 4/2016 |
| JP | 6030186 B1 | 11/2016 |
| KR | 10-2010-0068262 A | 6/2010 |
| WO | 2009/051254 A1 | 4/2009 |

OTHER PUBLICATIONS

Cadek, J., et al., "Creep in ODS copper reinforced with tungsten short fibres—an ODS copper-matrix/tungsten-short-fibre composite," Zeitschrift fur Metallkunde, Carl Hanser, vol. 95, No. 3, Mar. 1, 2004, pp. 179-184, 6 pages total.
Communication dated May 28, 2018 from the State Intellectual Property Office of the P.R.C. in counterpart Application No. 201611177762.4.
Communication dated Jun. 7, 2017, issued from the Europe Patent Office in corresponding Application No. 16204343.4.
International Search Report with Written Opinion dated Mar. 7, 2017, issued by the International Searching Authority in application No. PCT/JP2016/086155.
Communication issued Oct. 3, 2019 by the USPTO in U.S. Appl. No. 16/268,797.
"Additive Manufacturing of Copper Components with Selective Laser Melting", Fraunhofer Institute for Laser Technology ILT, Nov. 2011 (total 1 page).
Office Action for U.S. Appl. No. 16/268,797 dated Jan. 16, 2020.
Office Action dated Jun. 5, 2020 issued in U.S. Appl. No. 15/379,621.
Communication dated Feb. 24, 2021 from the Korean Patent Office in Application No. 10-2018-7019598.

* cited by examiner

METAL POWDER, METHOD OF PRODUCING ADDITIVELY-MANUFACTURED ARTICLE, AND ADDITIVELY-MANUFACTURED ARTICLE

CROSS-REFERENCE TO RELATED APPLICATIONS

This application is a divisional of U.S. patent application Ser. No. 15/379,621, filed Dec. 15, 2016 (pending), which claims benefit of priority to Japanese Patent Application No. 2015-254077, filed Dec. 25, 2015. The entire disclosures of the prior applications are considered part of the disclosure of the accompanying divisional application, and are hereby incorporated by reference.

BACKGROUND OF THE INVENTION

Field of the Invention

The present invention relates to a metal powder, a method of producing an additively-manufactured article, and an additively-manufactured article.

Description of the Background Art

Japanese Patent Laying-Open No. 2011-021218 discloses a laser additive-manufacturing apparatus (so-called "3D printer") for metal powder.

SUMMARY OF THE INVENTION

The additive manufacturing method for metal powder is of interest as a processing technology for metal products. An advantage of this method is that complicated shapes which have been impossible by cutting work can be produced.

Examples of additively-manufactured articles produced from iron-based alloy powder, aluminum alloy powder, titanium alloy powder, and the like have heretofore been reported. Currently, however, the kinds of metals available for additive manufacturing are limited, and there is a certain restriction on metal products to which additive manufacturing is applicable.

An object of the present invention is to provide a metal powder for additive manufacturing, made up of a copper alloy and enabling both an adequate mechanical strength and an adequate electrical conductivity to be achieved, provide a method of producing an additively-manufactured article, and provide an additively manufactured article.

[1] The metal powder is a metal powder for additive manufacturing. The metal powder contains: not less than 0.2 mass % and not more than 1.3 mass % of aluminum; and a balance including copper and an incidental impurity.

[2] The method of producing an additively-manufactured article includes: a first step of forming a powder layer including a metal powder of the above [1]; and a second step of forming a shaped layer by solidifying the metal powder at a predetermined position in the powder layer. The first step and the second step of this production method are successively repeated to stack the shaped layers and produce an additively-manufactured article.

[3] The method of producing an additively-manufactured article of the above [2] may further include a heat treatment step of heat-treating the additively-manufactured article.

[4] The additively-manufactured article is an additively-manufactured article made from a copper alloy. The copper alloy contains: not less than 0.2 mass % and not more than 1.3 mass % of aluminum; and a balance including copper and an incidental impurity. The additively-manufactured article has a relative density of not less than 96% and not more than 100% with respect to a theoretical density of the copper alloy, and has an electrical conductivity of not less than 30% IACS.

[5] As to the additively-manufactured article of the above [4], the electrical conductivity may be not less than 50% IACS.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

According to the foregoing, an additively-manufactured article made from a copper alloy and having both an adequate mechanical strength and an adequate electrical conductivity is provided.

In the following, an embodiment of the present invention (hereinafter referred to as "the present embodiment") will be described. The present invention, however, is not limited thereto.

Initially, how the inventors of the present invention attained the present embodiment will be described.

For mechanical parts required to have an adequate mechanical strength and an adequate electrical conductivity, mostly copper is used. Examples of such mechanical parts may for example be parts of welding torch, electric power distribution facility, and the like. The inventors atomized an ingot of pure copper to thereby obtain a copper powder, and tried to produce an additively-manufactured article from this copper powder. A desired additively-manufactured article, however, could not be obtained by this method. Specifically, the produced article had many voids and the density of the article was significantly decreased relative to that of the original ingot. Further, the electrical conductivity of the article was also significantly decreased relative to that of the original ingot. The decrease of the density is considered as inevitably resulting in decrease of the mechanical strength. The inventors tried to improve physical properties by changing various conditions. As long as the pure copper was used, however, the final physical properties were not stable even under the same conditions, and it was impossible to obtain both an adequate mechanical strength and an adequate electrical conductivity.

The inventors then studied copper alloys. As a result, the inventors found that a copper alloy powder having a specific alloy composition could be used to produce an additively-manufactured article having both an adequate mechanical strength and an adequate electrical conductivity.

"Having both an adequate mechanical strength and an adequate electrical conductivity" herein means that an additively-manufactured article satisfies all of the following conditions (a) to (c).

(a) The tensile strength is approximately equal to or more than 130 MPa. This tensile strength is almost close to the value of the tensile strength of an ingot of oxygen-free copper (JIS alloy No.: C1020) as pure copper. Therefore, the additively-manufactured article is expected to be applicable to various uses. Preferably, the tensile strength is approximately equal to or more than 195 MPa. This tensile strength is equivalent to or more than the tensile strength of an ingot of oxygen-free copper.

Figure 8:
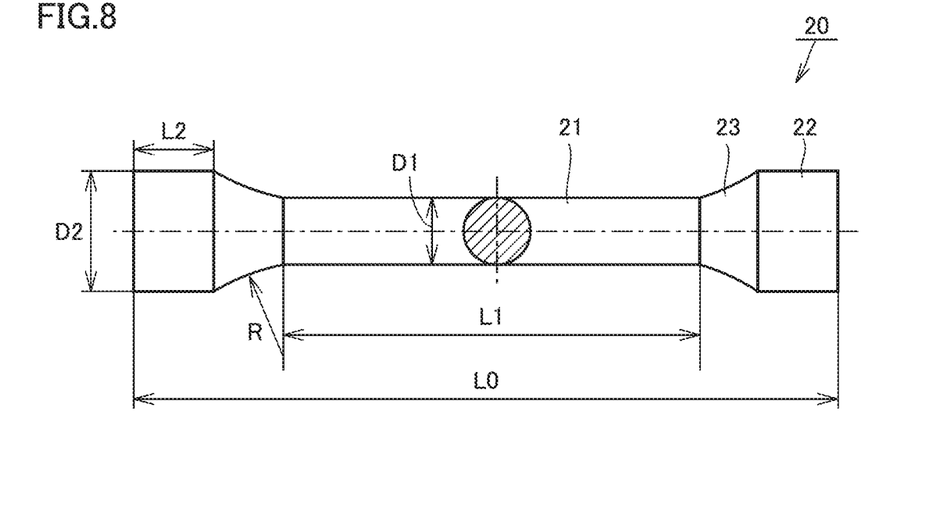
FIG. 8 is a plan view showing a test specimen used for a tensile test.

The tensile strength is measured through the following procedure. For measurement of the tensile strength, a tension testing machine of Grade one or more under "JIS B 7721: Tension/compression testing machines—verification and calibration of the force-measuring system" is used. Initially, as an additively-manufactured article to be tested, a dumbbell-shaped test specimen 20 is manufactured. As shown in FIG. 8, dumbbell-shaped test specimen 20 has a shape like a dumbbell made up of a columnar parallel portion 21, tapered shoulder portions 23 expanding gradually from respective opposite ends of this parallel portion 21, and columnar grip portions 22 extending from shoulder portions 23 to serve as a grip device of the tensile testing machine or serve as a part to be gripped by a jig.

Next, such a dumbbell-shaped test specimen 20 is tensioned at a rate of 2 mm/min by using the tension testing machine until the test specimen is broken. At this time, as a gripping tool or jig, any tool appropriate for the shape of dumbbell-shaped test specimen 20 is used. Adjustments are further made so that a force is applied in the axial direction of dumbbell-shaped test specimen 20. The maximum tensile stress detected before the test specimen is broken is measured. The maximum tensile stress is divided by the cross-sectional area of parallel portion 21 to thereby calculate the tensile stress. The cross-sectional area of parallel portion 21 is 9.616 mm$^2$ (=π×3.5 mm×3.5 mm/4). The dimensions of respective parts of dumbbell-shaped test specimen 20 shown in FIG. 8 are as follows.

total length L0 of dumbbell-shaped test specimen 20: 36 mm
  length L1 of parallel portion 21: 18±0.5 mm
  diameter D1 of parallel portion 21: 3.5±0.05 mm
  radius R of shoulder portion 23: 10 mm
  length L2 of grip portion 22: 4.0 mm
  diameter D2 of grip portion 22: 6.0 mm (b) The relative density with respect to the theoretical density is 96% or more. The theoretical density of an alloy is herein represented by the density of a cast material having the same composition as the alloy. The relative density with respect to the theoretical density is represented by a value in percentage determined by dividing the actually measured density of the additively-manufactured article by the theoretical density of the alloy. Therefore, the upper limit of the relative density is 100%.

(c) The electrical conductivity is 30% IACS (International Annealed Copper Standard) or more defined with respect to the electrical conductivity 100% IACS of an annealed copper standard. The electrical conductivity may preferably be not less than 50% IACS.

[Metal Powder]

The metal powder of the present embodiment is a metal powder for additive manufacturing. The metal powder corresponds to toner/ink for a common two-dimensional printer. The metal powder contains: not less than 0.2 mass % and not more than 1.3 mass % of aluminum (Al); and a balance including copper (Cu) and an incidental impurity. The Cu content in the metal powder may for example be not less than 98.7 mass % or not more than 99.8 mass %.

The Cu content in the metal powder can be measured by a method complying with "JIS H 1051: Methods for determination of copper in copper and copper alloys." The Al content can be measured by an ICP emission spectrometry complying with "JIS H 1057: Methods for determination of aluminum in copper and copper alloys." The upper limit of the Al content in the metal powder may be 1.3 mass %. The lower limit of the Al content may be 0.23 mass %.

The metal powder may contain an impurity element(s) besides Al. The impurity element is an element (incidental impurity) incidentally mixed during production. Thus, in the metal powder of the present embodiment, the balance includes Cu and an incidental impurity (impurities). The impurity element may be oxygen (O), phosphorus (P), and the like. The content of the impurity element(s) may for example be less than 0.1 mass %, or less than 0.05 mass %.

The metal powder of the present embodiment includes for example an aluminum-containing copper alloy powder as described below.

Aluminum-Containing Copper Alloy Powder

The aluminum-containing copper alloy powder includes: not less than 0.2 mass % and not more than 1.3 mass % of Al; and a balance including Cu and an incidental impurity. The copper alloy powder having such a chemical composition enables the additively-manufactured article to have both an adequate mechanical strength and an adequate electrical conductivity. If the Al content is less than 0.2 mass %, this copper alloy powder's properties are close to those of pure copper (oxygen-free copper). Namely, if this copper alloy powder is used to produce an additively-manufactured article, the additively-manufactured article has many voids, and accordingly has a significantly lower density relative to an ingot of oxygen-free copper and a significantly lower electrical conductivity relative to an ingot of oxygen-free copper. If the Al content is more than 1.3 mass %, there is a possibility that an electrical conductivity of not less than 30% IACS cannot be ensured.

In the aluminum-containing copper alloy powder, the Al content may for example be not less than 0.23 mass % and not more than 1.3 mass %. When the Al content falls in this range, the mechanical strength and the electrical conductivity may be well balanced.

Particle-Size Distribution

The particle-size distribution of the metal powder is appropriately adjusted based on conditions for producing the powder, sizing, sieving, or the like. The average particle size of the metal powder may be adjusted in accordance with the pitch at which layers are stacked to produce an additively-manufactured article. The average particle size of the metal powder may for example be approximately 100 to 200 μm, approximately 50 to 100 μm, or approximately 5 to 50 μm. The average particle size herein refers to a particle size at a cumulative value of 50% (so-called "d50") in a particle-size distribution measured by the laser diffraction/scattering method. The particle shape of the metal powder is not particularly limited. The particle shape may be a substantially spherical shape or an irregular shape.

Method of Producing Metal Powder

The metal powder of the present embodiment is produced for example by a gas atomization method or a water atomization method. Namely, while alloy components in the molten state are dropped from the bottom of a tundish, the alloy components are allowed to contact high-pressure gas or high-pressure water, and the alloy components are rapidly cooled to be solidified. In this way, the alloy components are formed into particles. Alternatively, plasma atomization method, centrifugal atomization method, or the like may for example be used to produce the metal powder. The metal powder obtained through these production methods tends to enable a dense additively-manufactured article to be obtained.

[Method of Producing Additively-Manufactured Article]

In the following, a method of producing an additively-manufactured article from the above-described metal powder will be described. Here, a description will be given of a powder bed fusion method using a laser as means for solidifying the metal powder. This means, however, is not limited to the laser as long as the means can solidify the metal powder. The means may for example be electron beam, plasma, or the like. In the present embodiment, an additive manufacturing (AM) method other than the powder bed fusion method may be used. For example, in the present embodiment, the directed energy deposition method may also be used. Further, in the present embodiment, cutting may be performed during additive manufacturing.

Figure 1:
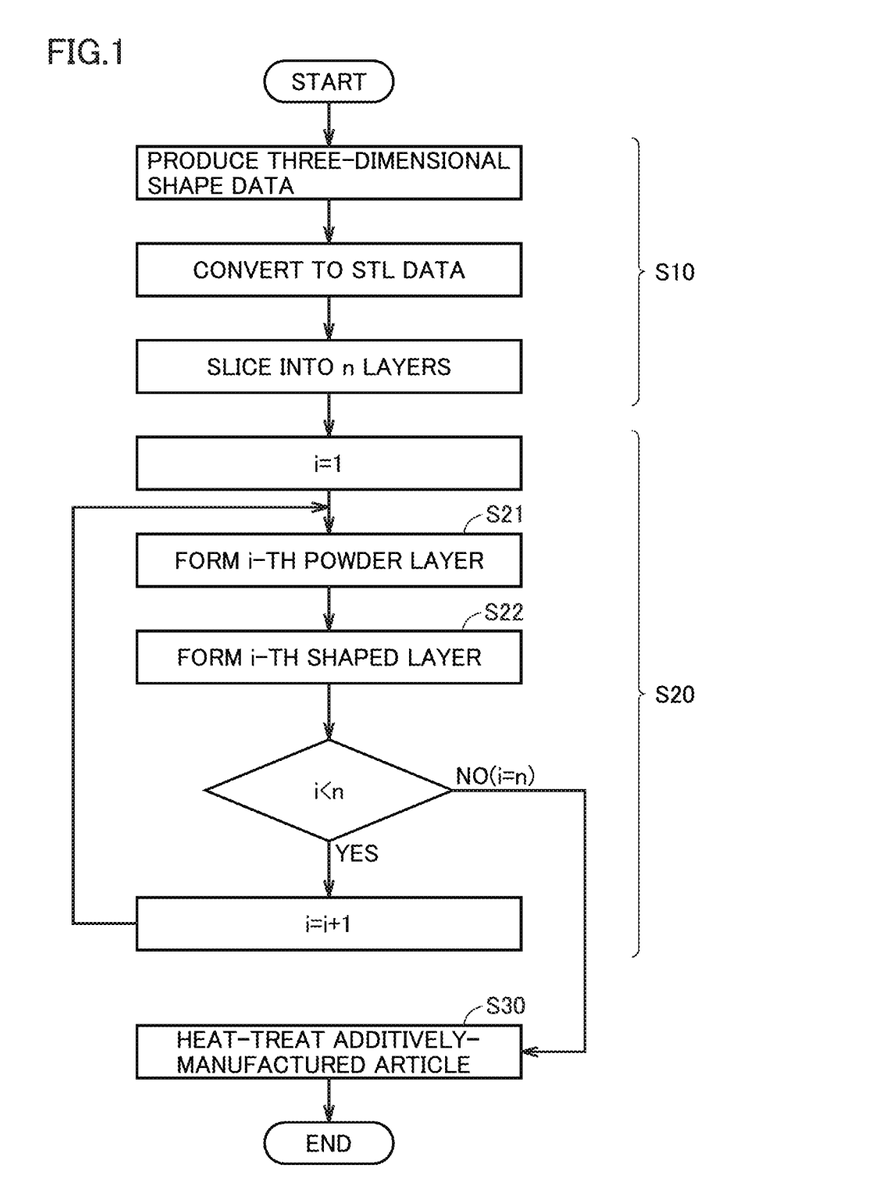
FIG. 1 is a flowchart generally showing a method of producing an additively-manufactured article according to an embodiment of the present invention.

FIG. 1 is a flowchart generally showing a method of producing an additively-manufactured article of the present embodiment. This production method includes a data processing step (S10) and an additive manufacturing step (S20). The production method may also include a heat treatment step (S30) after the additive manufacturing step (S20). The additive manufacturing step (S20) includes a first step (S21) and a second step (S22). According to this production method, the first step (S21) and the second step (S22) are successively repeated to thereby produce an additively-manufactured article. The production method will be described hereinafter with reference to FIGS. 1 to 7.

1. Data Processing Step (S10)

Figure 2:
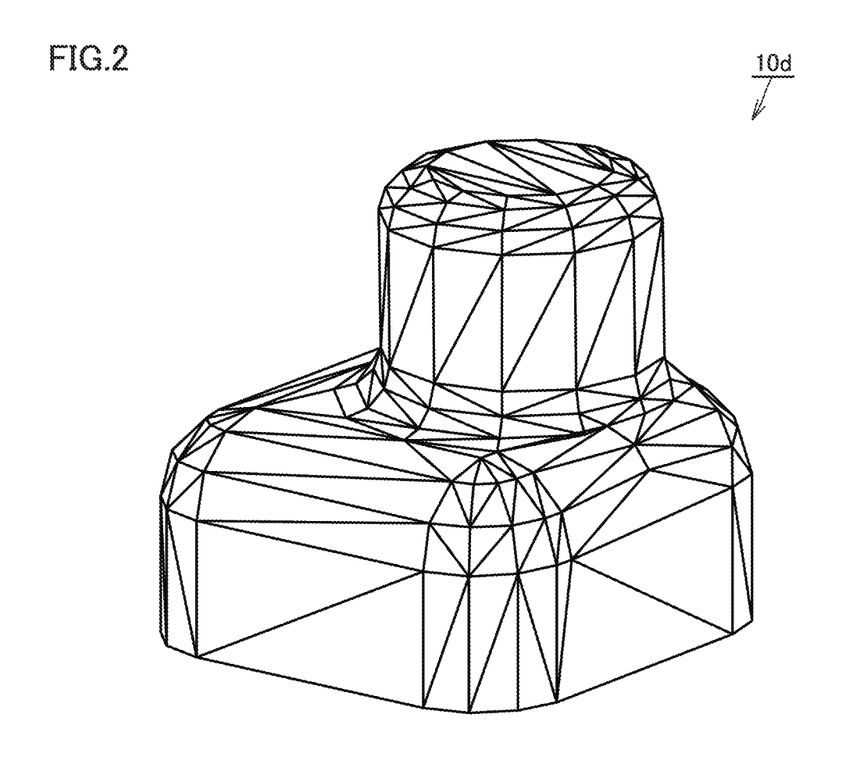
FIG. 2 is a schematic diagram showing an example of STL data.

First, three-dimensional shape data is produced by 3D-CAD or the like. The three-dimensional shape data is converted to STL data. FIG. 2 is a schematic diagram showing an example of STL data. In STL data 10d, division into elements (meshing) is done by the finite-element method, for example.

Figure 3:
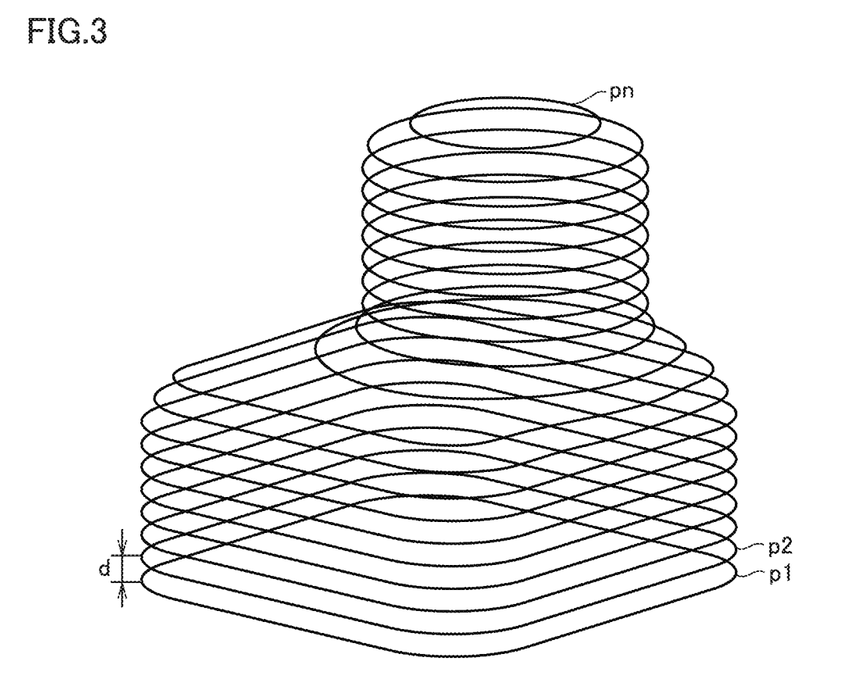
FIG. 3 is a schematic diagram showing an example of slice data.

From the STL data, slice data is produced. FIG. 3 is a schematic diagram showing an example of slice data. The STL data is divided into n layers, namely a first shaped layer p1 to an n-th shaped layer pn. The slice thickness d is approximately 10 to 150 µm for example. The slice thickness d may be approximately 10 to 50 µm for example.

2. Additive Manufacturing Step (S20)

Figure 4:
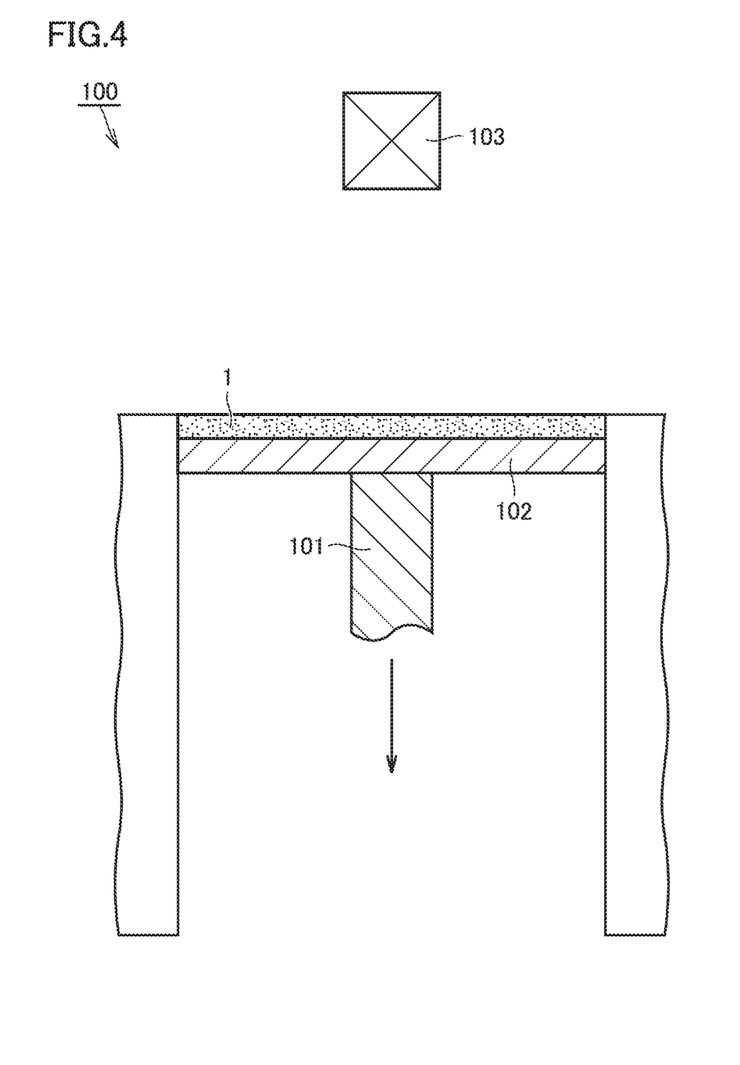
FIG. 4 is a first schematic diagram illustrating a process of producing an additively-manufactured article.

Subsequently, based on the slice data, an additively-manufactured article is produced. FIG. 4 is a first schematic diagram illustrating a process of producing an additively-manufactured article. A laser additive-manufacturing apparatus 100 shown in FIG. 4 includes a piston 101, a table 102 supported on piston 101, and a laser emission unit 103 which is to serve as an emission unit of a laser beam solidifying metal powder. This step and subsequent steps are carried out in an inert gas atmosphere for example for suppressing oxidation of the additively-manufactured article. The inert gas may for example be argon (Ar), nitrogen ($N_2$), helium (He), or the like. Instead of the inert gas, a reducing gas such as hydrogen ($H_2$) for example may be used. Moreover, a vacuum pump or the like may be used to produce a reduced-pressure atmosphere.

Piston 101 is configured to be capable of lifting and lowering table 102. On table 102, the additively-manufactured article is produced.

2-1. First Step (S21)

In the first step (S21), a powder layer including the metal powder is formed. Based on the slice data, piston 101 lowers table 102 by a distance corresponding to one layer. On table 102, the metal powder corresponding to one layer is spread. In this way, a first powder layer 1 including the metal powder is formed. The surface of first powder layer 1 is smoothed by means of a squeezing blade or the like (not shown). The powder layer may also include a laser absorber (resin powder for example) or the like, in addition to the metal powder. The powder layer may be substantially made up of only the metal powder.

2-2. Second Step (S22)

Figure 5:
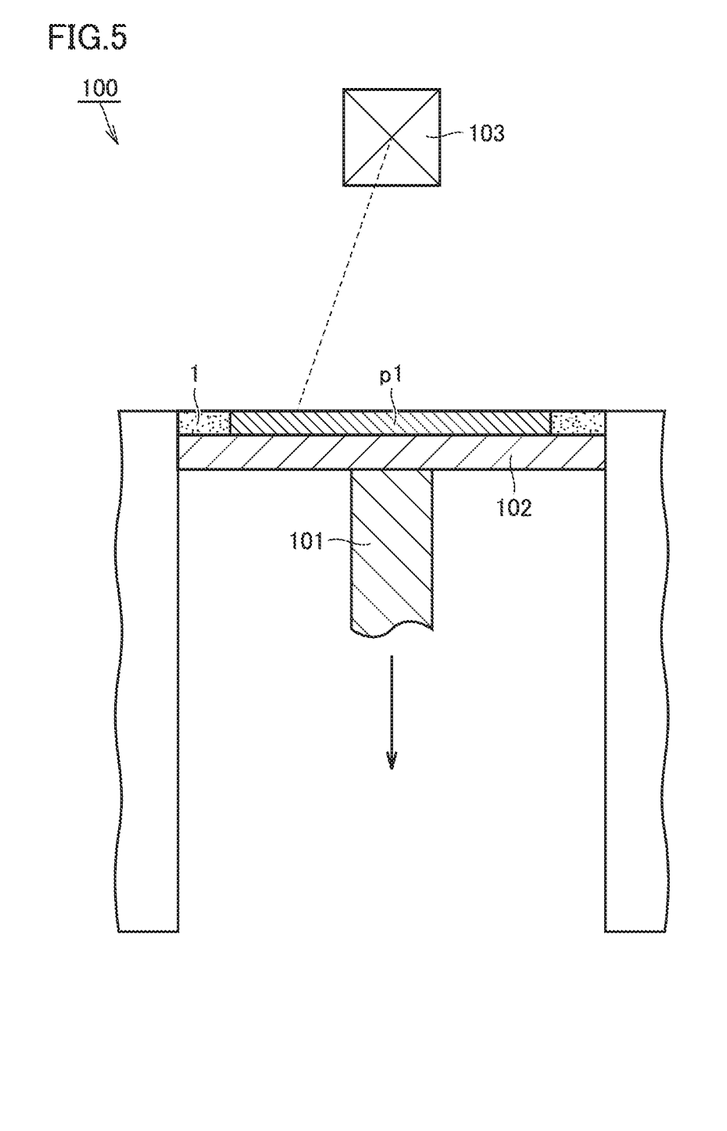
FIG. 5 is a second schematic diagram illustrating the process of producing an additively-manufactured article.

FIG. 5 is a second schematic diagram illustrating the process of producing an additively-manufactured article. In the second step (S22), a shaped layer which is to form a part of the additively-manufactured article is formed.

Laser emission unit 103 applies a laser beam to a predetermined position in first powder layer 1, based on the slice data. Before the laser beam is applied, the powder layer may be heated in advance. The metal powder irradiated with the laser beam is melted and sintered and accordingly solidified. In this way, the metal powder at a predetermined position in first powder layer 1 is solidified to thereby form first shaped layer p1.

As the laser emission unit of the present embodiment, a general-purpose laser device may be used. As a laser beam source, a fiber laser, a YAG laser, a $CO_2$ laser, a semiconductor laser, or the like is used. The laser beam output power may for example be approximately 100 to 1000 W, or approximately 200 to 500 W, or approximately 350 to 450 W. The laser beam scanning velocity may be adjusted within a range for example of 100 to 1000 mm/s, or adjusted within a range of 200 to 600 mm/s. The laser beam energy density may be adjusted within a range for example of 100 to 1000 $J/mm^3$.

The laser beam energy density herein refers to a value calculated in accordance with the following expression (I):

$$E=P/(v\times s\times d) \quad (I).$$

In expression (I), E represents laser beam energy density [unit: $J/mm^3$], P represents laser output power [unit: W], v represents scanning velocity [unit: mm/s], s represents scanning width [unit: mm], and d represents slice thickness [unit: mm].

Figure 6:
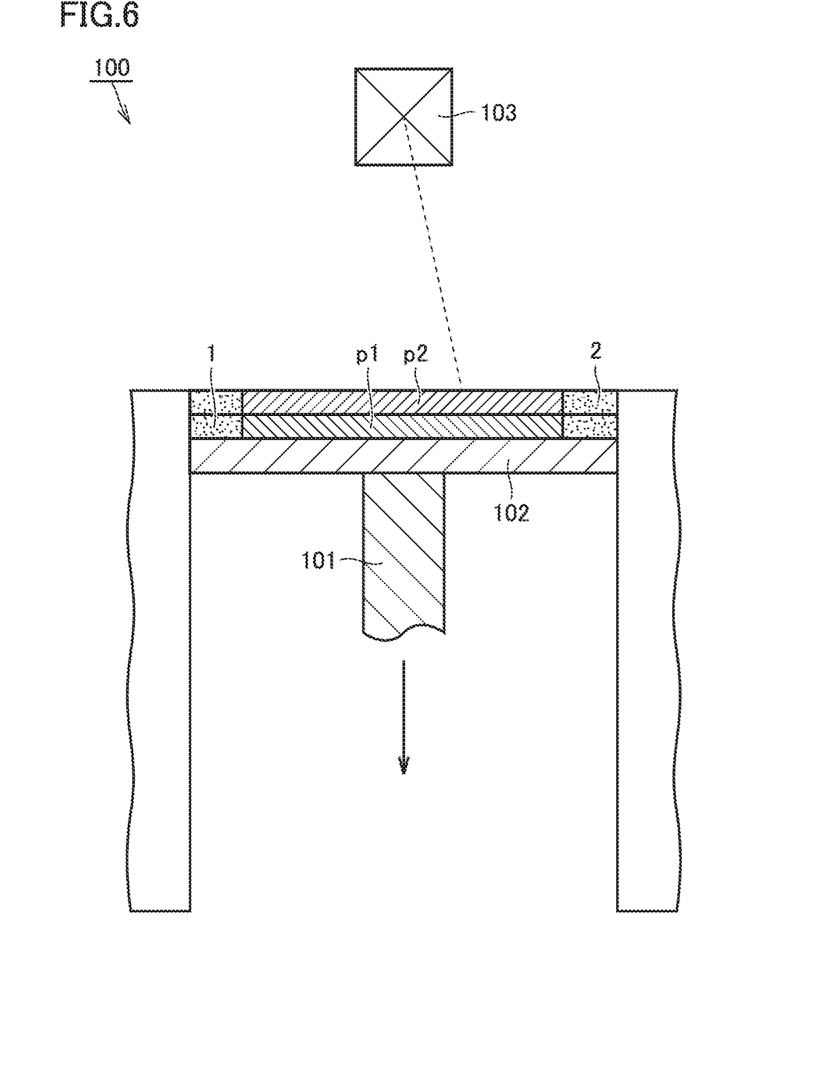
FIG. 6 is a third schematic diagram illustrating the process of producing an additively-manufactured article.
Figure 7:
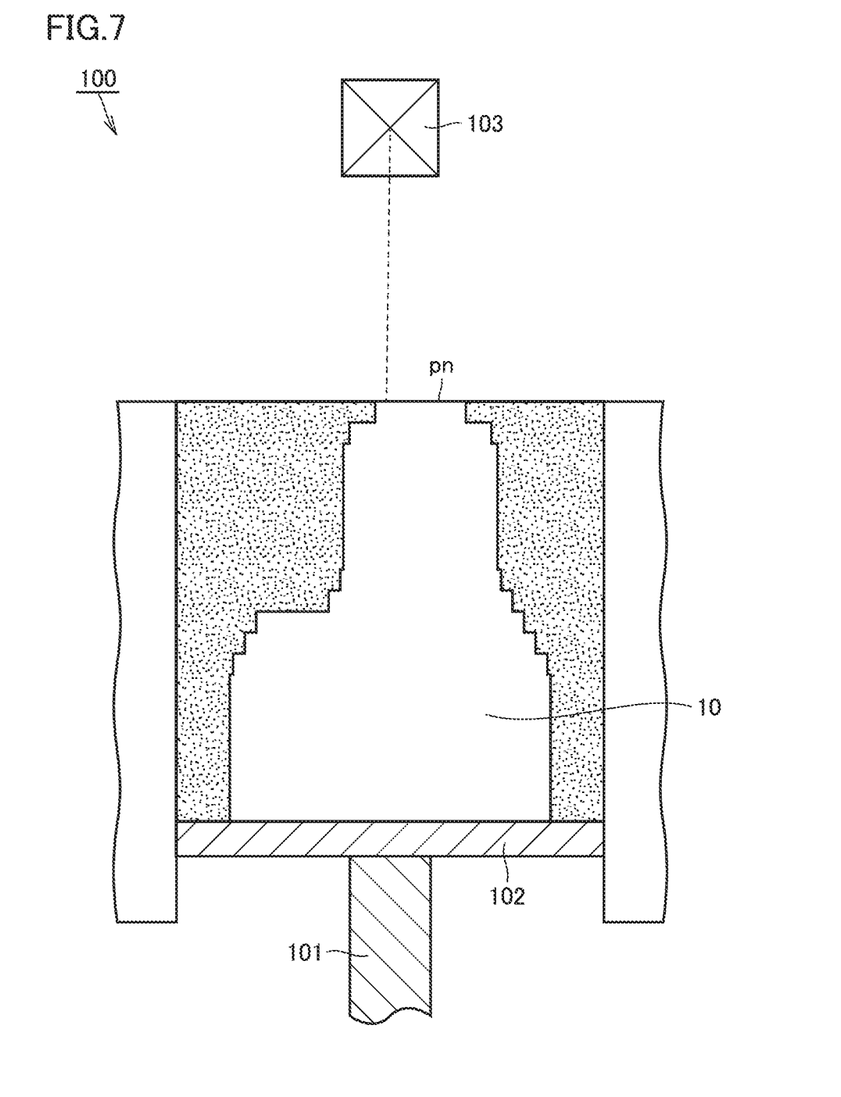
FIG. 7 is a fourth schematic diagram illustrating the process of producing an additively-manufactured article.

FIG. 6 is a third schematic diagram illustrating the process of producing an additively-manufactured article. As shown in FIG. 6, after first shaped layer p1 is formed, piston 101 further lowers table 102 by a distance corresponding to one layer. After this, a second powder layer 2 is formed in a similar manner to the above-described one, and a second shaped layer p2 is formed based on the slice data. After this, the first step (S21) and the second step (S22) are repeated. FIG. 7 is a fourth schematic diagram illustrating the process of producing an additively-manufactured article. As shown in FIG. 7, finally the n-th shaped layer pn is formed and thus an additively-manufactured article 10 is completed.

3. Third Step (S30)

Preferably, the additively-manufactured article is thereafter heat-treated. Namely, it is preferable for the additively-manufactured article to be heat-treated after additively manufactured. The heat treatment can be expected to improve the mechanical properties and the electrical conductivity of the additively-manufactured article. The atmosphere during the heat treatment may for example be an atmosphere of nitrogen, air, argon, hydrogen, vacuum, or the like. The heat treatment temperature may for example be not less than 300° C. and not more than 400° C. The time for heat treatment may for example be not less than two hours and not more than four hours.

[Additively-Manufactured Article]

In the following, a description will be given of an additively-manufactured article obtained in accordance with the above-described production method. The additively-manufactured article may have a complicated shape which cannot be obtained by cutting. Moreover, the additively-manufactured article of the present embodiment has both an adequate mechanical strength and an adequate electrical conductivity. The additively-manufactured article of the present embodiment is applicable to a plasma torch by way of example.

In the case where the metal powder of the present embodiment is used as a raw material, the additively-manufactured article may have the following composition.

Namely, the additively-manufactured article of the present embodiment is an additively-manufactured article made from a specific copper alloy. The copper alloy contains: not less than 0.2 mass % and not more than 1.3 mass % of Al; and a balance including Cu and an incidental impurity. Like the balance of the metal powder, the balance of the copper alloy may include an incidental impurity. The additively-manufactured article has a relative density of not less than 96% and not more than 100% with respect to the theoretical density, and has an electrical conductivity of not less than 30% IACS.

In the copper alloy, the upper limit of the Al content may be 1.3 mass %. The lower limit thereof may be 0.23 mass %.

The density of the additively-manufactured article can for example be measured in accordance with the Archimedes method. The density measurement in accordance with the Archimedes method may be done to comply with "JIS Z 2501: Sintered metal materials—Determination of density, oil content and open porosity." Water may be used as the liquid.

In the case where the relative density with respect to the theoretical density is not less than 96%, a mechanical strength adequate for practical use can be expected. A higher relative density is desired. The relative density of the additively-manufactured article may be not less than 96.5%, not less than 97.0%, not less than 97.5%, not less than 98.0%, not less than 98.5%, or not less than 99.0%.

The electrical conductivity can be measured by means of a commercially-available eddy-current conductivity meter. A higher electrical conductivity is also desired. The electrical conductivity of the additively-manufactured article may be not less than 30% IACS, not less than 40% IACS, or not less than 50% IACS.

Additively-Manufactured Article Made from Aluminum-Containing Copper Alloy

In the case where the aluminum-containing copper alloy powder of the present embodiment is used as a raw material, the additively-manufactured article may have the following composition.

Namely, the additively-manufactured article is an additively-manufactured article made from a specific aluminum-containing copper alloy. The aluminum-containing copper alloy contains: not less than 0.2 mass % and not more than 1.3 mass % of Al; and a balance including Cu and an incidental impurity. Like the balance of the metal powder, the balance of the copper alloy may include an incidental impurity. The additively-manufactured article has a relative density of not less than 96% and not more than 100% with respect to the theoretical density of the aluminum-containing copper alloy, and has an electrical conductivity of not less than 30% IACS. In the case where the Al content of the additively-manufactured article is not less than 0.23 mass % and not more than 1.3 mass %, the additively-manufactured article can be expected to have both the mechanical strength based on a relative density of not less than 96.0% and an electrical conductivity of not less than 30% IACS (preferably not less than 50% IACS).

EXAMPLES

In the following, the present embodiment will be described in connection with Examples. The present embodiment, however, is not limited to them.

1. Preparation of Metal Powder

Metal powders E1, E2, E3, E4, X, and Y each containing the chemical components shown in Table 1 were prepared.

TABLE 1

List of Metal Powders

| | chemical components | d50 (μm) |
|---|---|---|
| E1 | Al (0.23 mass %); O (less than 0.01 mass %); Cu (balance) | 24.4 |
| E2 | Al (0.58 mass %); O (less than 0.02 mass %); Cu (balance) | 25.1 |
| E3 | Al (0.81 mass %); O (less than 0.01 mass %); Cu (balance) | 24.7 |
| E4 | Al (1.3 mass %); Cu (balance) | 23.4 |
| X | Cu (99.99 mass % or more) | 21.3 |
| Y | Ni (2.52 mass %); Si (0.71 mass %); Cr (0.31 mass %); Cu (balance) | 20.0 |

These metal powders were produced in accordance with a predetermined atomization method. Metal powders E1, E2, E3, and E4 correspond to Examples. The Cu content in metal powders E1, E2, E3, and E4 was measured by an electrogravimetric method for determining copper content (nitric acid-sulfuric acid method) complying with "JIS H 1051: Methods for determination of copper in copper and copper alloys." The Al content in metal powders E1, E2, E3, and E4 was measured by an ICP emission spectrometry complying with "JIS H 1057: Methods for determination of aluminum in copper and copper alloys." As to the incidental impurity content in metal powders E1, E2, E3, and E4, the oxygen content was measured in accordance with "JIS Z 2613: Inert gas fusion-infrared absorption method" and the phosphorus content was measured in accordance with "JIS H 1058: Absorption spectroscopy."

Metal powder X was produced from an ingot (JIS alloy No.: C1020) of a commercially-available pure copper (so-called oxygen-free copper). Metal powder Y was produced from an ingot of a commercially-available copper alloy (product name "AMPCO940"). Metal powder X and metal powder Y correspond to Comparative Examples.

2. Laser Additive-Manufacturing Apparatus.

A laser additive-manufacturing apparatus with the following specifications was prepared.
 laser: fiber laser, maximum output power 400 W
 spot diameter: 0.05 to 0.20 mm
 scanning velocity: not more than 7000 mm/s
 layer stack pitch: 0.02 to 0.08 mm
 maximum build size: 250 mm×250 mm×280 mm 3. Production of Additively-Manufactured Article The above-described apparatus was used to produce an additively-manufactured article having a columnar shape (diameter 14 mm×height 15 mm).

3-1. Pure Copper Powder (Metal Powder X)

Following the additive manufacturing step (S20) in the flow shown in FIG. 1, the first step (S21) of forming a powder layer including the metal powder, and the second step (S22) of forming a shaped layer by applying a laser beam at a predetermined position in the powder layer to thereby solidify the metal powder were successively repeated. Accordingly, additively-manufactured articles of No. X-1 to No. X-40 were produced from the pure copper powder (metal powder X) which was produced from an ingot of a commercially-available pure copper.

Conditions for producing each additively-manufactured article, as well as respective numerical values of the relative density, the tensile strength, and the electrical conductivity of the additively-manufactured article measured in accordance with the above-described methods are shown in Table 2 and Table 3. Further, for No. X-41 and No. X-42, dumbbell-shaped test specimens 20 shown in FIG. 8 were separately produced as additively-manufactured articles, and the tensile strength was measured for the test specimens in accordance with the above-described method. They are shown in Table 3.

TABLE 2

Commercially-Available Pure Copper

| | production method | | | additively-manufactured article | | | after heat treatment |
|---|---|---|---|---|---|---|---|
| | 1st step powder | 2nd step laser irradiation conditions | | | | | |
| No. | layer metal powder | scanning velocity mm/s | energy density J/mm³ | relative density % | tensile strength MPa | electrical conductivity % IACS | electrical conductivity % IACS |
| X-1 | X | 200 | 587.3 | unmeasurable | — | 49.58 | — |
| X-2 | X | 200 | 587.3 | unmeasurable | — | 64.72 | — |
| X-3 | X | 200 | 587.3 | unmeasurable | — | 50.44 | — |
| X-4 | X | 200 | 587.3 | unmeasurable | — | 65.85 | — |
| X-5 | X | 200 | 587.3 | 96.723 | — | 85.24 | — |
| X-6 | X | 200 | 587.3 | 92.260 | — | 67.21 | — |
| X-7 | X | 200 | 587.3 | unmeasurable | — | 48.89 | — |
| X-8 | X | 200 | 587.3 | unmeasurable | — | 64.95 | — |
| X-9 | X | 300 | 391.5 | unmeasurable | — | 63.13 | — |
| X-10 | X | 300 | 391.5 | unmeasurable | — | 63.59 | — |
| X-11 | X | 300 | 391.5 | unmeasurable | — | 67.89 | — |
| X-12 | X | 300 | 391.5 | unmeasurable | — | 65.63 | — |
| X-13 | X | 300 | 391.5 | unmeasurable | — | 58.15 | — |
| X-14 | X | 300 | 391.5 | unmeasurable | — | 68.12 | — |
| X-15 | X | 300 | 391.5 | unmeasurable | — | 64.04 | — |
| X-16 | X | 300 | 391.5 | unmeasurable | — | 61.32 | — |
| X-17 | X | 400 | 293.7 | unmeasurable | — | 70.51 | — |
| X-18 | X | 400 | 293.7 | unmeasurable | — | 63.13 | — |
| X-19 | X | 400 | 293.7 | unmeasurable | — | 75.21 | — |
| X-20 | X | 400 | 293.7 | unmeasurable | — | 66.15 | — |
| X-21 | X | 400 | 293.7 | unmeasurable | — | 62.68 | — |
| X-22 | X | 400 | 293.7 | 92.215 | — | 67.67 | — |
| X-23 | X | 400 | 293.7 | unmeasurable | — | 71.14 | — |
| X-24 | X | 400 | 293.7 | unmeasurable | — | 63.13 | — |

TABLE 3

Commercially-Available Pure Copper

| | production method | | | additively-manufactured article | | | after heat treatment |
|---|---|---|---|---|---|---|---|
| | 1st step powder | 2nd step laser irradiation conditions | | | | | |
| No. | layer metal powder | scanning velocity mm/s | energy density J/mm³ | relative density % | tensile strength MPa | electrical conductivity % IACS | electrical conductivity % IACS |
| X-25 | X | 500 | 234.9 | unmeasurable | — | 73.64 | — |
| X-26 | X | 500 | 234.9 | unmeasurable | — | 62.00 | — |
| X-27 | X | 500 | 234.9 | 93.054 | — | 82.10 | — |
| X-28 | X | 500 | 234.9 | unmeasurable | — | 64.27 | — |
| X-29 | X | 500 | 234.9 | unmeasurable | — | 64.04 | — |
| X-30 | X | 500 | 234.9 | unmeasurable | — | 65.40 | — |
| X-31 | X | 500 | 234.9 | unmeasurable | — | 75.21 | — |
| X-32 | X | 500 | 234.9 | unmeasurable | — | 62.23 | — |

TABLE 3-continued

Commercially-Available Pure Copper

| | production method | | | additively-manufactured article | | | after heat treatment |
|---|---|---|---|---|---|---|---|
| | 1st step | 2nd step laser irradiation conditions | | | | | |
| No. | layer metal powder | scanning velocity mm/s | energy density J/mm³ | relative density % | tensile strength MPa | electrical conductivity % IACS | electrical conductivity % IACS |
| X-33 | X | 600 | 195.8 | unmeasurable | — | 89.46 | — |
| X-34 | X | 600 | 195.8 | unmeasurable | — | 73.96 | — |
| X-35 | X | 600 | 195.8 | 98.311 | — | 92.58 | — |
| X-36 | X | 600 | 195.8 | unmeasurable | — | 75.21 | — |
| X-37 | X | 600 | 195.8 | unmeasurable | — | 61.77 | — |
| X-38 | X | 600 | 195.8 | unmeasurable | — | 75.21 | — |
| X-39 | X | 600 | 195.8 | 98.311 | — | 90.24 | — |
| X-40 | X | 600 | 195.8 | unmeasurable | — | 73.33 | — |
| X-41 | X | 200 | 587.3 | — | 55 | — | — |
| X-42 | X | 200 | 587.3 | — | 36 | — | — |

As seen from Table 2 and Table 3, the additively-manufactured articles produced from the pure copper powder (metal powder X) significantly vary from one another in final physical properties even under the same conditions. "Unmeasurable" in Table 2 means that a highly reliable density could not be measured by the Archimedes method due to an excessively large number of voids. The electrical conductivity of an ingot of the commercially-available pure copper may be considered as approximately 100% IACS. In contrast, the additively-manufactured article produced from metal powder X has a significantly lower electrical conductivity. Moreover, the additively-manufactured article produced from metal powder X has a significantly lower tensile strength value relative to the tensile strength (approximately 195 MPa) of the ingot of the commercially-available pure copper. Based on these results, it is considered difficult to produce a practically applicable mechanical part from the pure copper powder produced from an ingot of oxygen-free copper.

3-2. Copper Alloy Powder (Metal Powder Y)

Following the additive manufacturing step (S20) in the flow shown in FIG. 1, the first step (S21) of forming a powder layer including the metal powder, and the second step (S22) of forming a shaped layer by applying a laser beam at a predetermined position in the powder layer to thereby solidify the metal powder were successively repeated. Accordingly, additively-manufactured articles of No. Y-1 to No. Y-7 were produced from the copper alloy powder (metal powder Y) which was produced from an ingot of a commercially-available copper alloy (product name "AMPCO940").

Conditions for producing each additively-manufactured article, as well as respective numerical values of the relative density and the electrical conductivity of the additively-manufactured article measured in accordance with the above-described methods are shown in Table 4.

TABLE 4

Commercially-Available Copper Alloy

| | production method | | | additively-manufactured article | | | after heat treatment |
|---|---|---|---|---|---|---|---|
| | 1st step | 2nd step laser irradiation conditions | | | | | |
| No. | layer metal powder | scanning velocity mm/s | energy density J/mm³ | relative density % | tensile strength MPa | electrical conductivity % IACS | electrical conductivity % IACS |
| Y-1 | Y | 400 | 156.3 | 99.03 | — | — | — |
| Y-2 | Y | 400 | 156.3 | 98.98 | — | 15.97 | 18.23 |
| Y-3 | Y | 400 | 156.3 | 99.07 | — | 15.97 | 18.23 |
| Y-4 | Y | 400 | 156.3 | 99.30 | — | — | — |
| Y-5 | Y | 800 | 192.7 | 99.23 | — | 15.93 | 18.37 |
| Y-6 | Y | 800 | 192.7 | 99.49 | — | 15.97 | 18.50 |
| Y-7 | Y | 800 | 192.7 | 99.33 | — | — | — |

As seen from Table 4, the additively-manufactured articles produced from the copper alloy powder (metal powder Y) had a higher relative density as compared with the additively-manufactured articles produced from metal powder X. The electrical conductivity, however, was significantly lower as compared with the original ingot (approximately 45.5% IACS). Based on these results, it is also considered difficult to produce a practically applicable mechanical part from the copper alloy powder having the composition different from the present invention.

3-3. Aluminum-Containing Copper Alloy Powder (Metal Powders E1, E2, E3, and E4)

3-3-1. Al=0.23 Mass % (Metal Powder E1)

Following the additive manufacturing step (S20) in the flow shown in FIG. 1, the first step (S21) of forming a powder layer including the metal powder, and the second step (S22) of forming a shaped layer by applying a laser beam at a predetermined position in the powder layer to thereby solidify the metal powder were successively repeated. Accordingly, additively-manufactured articles of No. E1-1 to No. E1-9 were produced from the copper alloy powder (metal powder E1) containing 0.23 mass % of aluminum.

Conditions for producing each additively-manufactured article, as well as respective numerical values of the relative density, the tensile strength, and the electrical conductivity of the additively-manufactured article measured in accordance with the above-described methods are shown in Table 5. Further, for No. E1-10 and No. E1-11, dumbbell-shaped test specimens 20 shown in FIG. 8 were separately produced as additively-manufactured articles, and the tensile strength was measured for the test specimens.

As seen from Table 5, regarding the additively-manufactured articles produced from the copper alloy powder (metal powder E1) containing 0.23 mass % of aluminum, variation between the additively-manufactured articles in terms of final physical properties was reduced relative to the additively-manufactured articles produced from the pure copper powder (metal powder X) in Table 2 and Table 3, and the compactness corresponding to a relative density of more than 96% was achieved. Further, these additively-manufactured articles also had a good tensile strength, and thus had both an electrical conductivity higher than 53% IACS and an adequate mechanical strength. It has therefore been found that the copper alloy powder containing 0.23 mass % of aluminum is an excellent copper alloy powder that enables both an adequate electrical conductivity and an adequate mechanical strength of the additively-manufactured article to be achieved.

3-3-2. Al=0.58 Mass % (Metal Powder E2)

Following the additive manufacturing step (S20) in the flow shown in FIG. 1, the first step (S21) of forming a powder layer including the metal powder, and the second step (S22) of forming a shaped layer by applying a laser beam at a predetermined position in the powder layer to thereby solidify the metal powder were successively repeated. Accordingly, additively-manufactured articles of No. E2-1 to No. E2-15 were produced from the copper alloy powder (metal powder E2) containing 0.58 mass % of aluminum.

Conditions for producing each additively-manufactured article, as well as respective numerical values of the relative density, the tensile strength, and the electrical conductivity of the additively-manufactured article measured in accordance with the above-described methods are shown in Table 6. Further, for No. E2-16 to No. E2-19, dumbbell-shaped test specimens 20 shown in FIG. 8 were separately produced as additively-manufactured articles, and the tensile strength was measured for the test specimens.

TABLE 5

Al-Containing Cu Alloy (Al = 0.23 mass %)

| | production method | | | additively-manufactured article | | | after heat treatment |
|---|---|---|---|---|---|---|---|
| | 1st step | 2nd step | | | | | |
| | powder | laser irradiation conditions | | | | | |
| No. | layer metal powder | scanning velocity mm/s | energy density J/mm³ | relative density % | tensile strength MPa | electrical conductivity % IACS | electrical conductivity % IACS |
| E1-1 | E1 | 200 | 587.3 | 98.161 | — | 59.17 | — |
| E1-2 | E1 | 300 | 391.5 | 96.335 | — | 56.63 | — |
| E1-3 | E1 | 200 | 587.3 | 98.055 | — | 56.73 | — |
| E1-4 | E1 | 300 | 391.5 | 98.021 | — | 59.05 | — |
| E1-5 | E1 | 400 | 293.7 | 97.662 | — | 57.60 | — |
| E1-6 | E1 | 500 | 234.9 | 97.511 | — | 56.74 | — |
| E1-7 | E1 | 600 | 195.8 | 97.371 | — | 55.13 | — |
| E1-8 | E1 | 500 | 234.9 | 96.077 | — | 53.85 | — |
| E1-9 | E1 | 600 | 195.8 | 97.309 | — | 54.81 | — |
| E1-10 | E1 | 300 | 391.5 | — | 138.02 | — | — |
| E1-11 | E1 | 300 | 391.5 | — | 133.82 | — | — |

TABLE 6

Al-Containing Cu Alloy (Al = 0.58 mass %)

| | production method | | | additively-manufactured article | | | after heat treatment |
|---|---|---|---|---|---|---|---|
| | 1st step powder | 2nd step laser irradiation conditions | | | | | |
| No. | layer metal powder | scanning velocity mm/s | energy density J/mm³ | relative density % | tensile strength MPa | electrical conductivity % IACS | electrical conductivity % IACS |
| E2-1  | E2 | 200 | 587.3 | 98.581 | —     | 51.13 | 51.50 |
| E2-2  | E2 | 300 | 391.5 | 97.492 | —     | 51.39 | 52.26 |
| E2-3  | E2 | 400 | 293.7 | 96.869 | —     | 50.79 | 51.56 |
| E2-4  | E2 | 500 | 234.9 | 96.161 | —     | 49.67 | 50.36 |
| E2-5  | E2 | 200 | 587.3 | 98.486 | —     | 50.37 | 52    |
| E2-6  | E2 | 300 | 391.5 | 98.256 | —     | 50.96 | 52.34 |
| E2-7  | E2 | 400 | 293.7 | 98.048 | —     | 51.39 | 52.6  |
| E2-8  | E2 | 500 | 234.9 | 98.261 | —     | 50.96 | 52.43 |
| E2-9  | E2 | 300 | 391.5 | 96.784 | —     | 47.8  | 49.06 |
| E2-10 | E2 | 400 | 293.7 | 97.194 | —     | 48.22 | 49.66 |
| E2-11 | E2 | 500 | 234.9 | 98.093 | —     | 48.64 | 49.92 |
| E2-12 | E2 | 600 | 195.8 | 98.722 | —     | 49.06 | 50.62 |
| E2-13 | E2 | 500 | 234.9 | 98.694 | —     | 51.05 | 52.09 |
| E2-14 | E2 | 600 | 234.9 | 98.379 | —     | 50.87 | 52    |
| E2-15 | E2 | 600 | 195.8 | 97.739 | —     | 50.87 | 52.09 |
| E2-16 | E2 | 500 | 234.9 | —      | 232.2 | —     | —     |
| E2-17 | E2 | 600 | 195.8 | —      | 219.4 | —     | —     |
| E2-18 | E2 | 500 | 234.9 | —      | 223.5 | —     | —     |
| E2-19 | E2 | 600 | 195.8 | —      | 223.7 | —     | —     |

As seen from Table 6, regarding the additively-manufactured articles produced from the copper alloy powder (metal powder E2) containing 0.58 mass % of aluminum, variation between the additively-manufactured articles in terms of final physical properties was reduced relative to the additively-manufactured articles produced from the pure copper powder (metal powder X) in Table 2 and Table 3, and the compactness corresponding to a relative density of more than 96% was achieved. These additively-manufactured articles achieved an electrical conductivity higher than 47% IACS, preferably higher than 50% IACS. They also had a tensile strength of approximately 219 MPa or more, which is equivalent to or more than the tensile strength of an ingot of oxygen-free copper. It has therefore been found that the copper alloy powder containing 0.58 mass % of aluminum is also an excellent copper alloy powder that enables both an adequate electrical conductivity and an adequate mechanical strength of the additively-manufactured article to be achieved.

3-3-3. Al=0.81 Mass % (Metal Powder E3)

Following the additive manufacturing step (S20) in the flow shown in FIG. 1, the first step (S21) of forming a powder layer including the metal powder, and the second step (S22) of forming a shaped layer by applying a laser beam at a predetermined position in the powder layer to thereby solidify the metal powder were successively repeated. Accordingly, additively-manufactured articles of No. E3-1 to No. E3-6 were produced from the copper alloy powder (metal powder E3) containing 0.81 mass % of aluminum.

Conditions for producing each additively-manufactured article, as well as respective numerical values of the relative density, the tensile strength, and the electrical conductivity of the additively-manufactured article measured in accordance with the above-described methods are shown in Table 7. Further, for No. E3-7 and No. E3-8, dumbbell-shaped test specimens 20 shown in FIG. 8 were separately produced as additively-manufactured articles, and the tensile strength was measured for the test specimens.

TABLE 7

Al-Containing Cu Alloy (Al = 0.81 mass %)

| | production method | | | additively-manufactured article | | |
|---|---|---|---|---|---|---|
| | 1st step powder | 2nd step laser irradiation conditions | | | | |
| No. | layer metal powder | scanning velocity mm/s | energy density J/mm³ | relative density % | tensile strength MPa | electrical conductivity % IACS |
| E3-1 | E3 | 200 | 587.3 | 98.622 | —     | 45.33 |
| E3-2 | E3 | 200 | 587.3 | 98.285 | —     | 44.37 |
| E3-3 | E3 | 200 | 587.3 | 97.835 | —     | 43.57 |
| E3-4 | E3 | 200 | 587.3 | 98.634 | —     | 45.01 |
| E3-5 | E3 | 200 | 587.3 | 97.498 | —     | 44.05 |
| E3-6 | E3 | 200 | 587.3 | 98.037 | —     | 43.41 |
| E3-7 | E3 | 200 | 587.3 | —      | 226.5 | —     |
| E3-8 | E3 | 200 | 587.3 | —      | 234.8 | —     |

As seen from Table 7, regarding the additively-manufactured articles produced from the copper alloy powder (metal powder E3) containing 0.81 mass % of aluminum, variation between the additively-manufactured articles in terms of final physical properties was reduced relative to the additively-manufactured articles produced from the pure copper powder (metal powder X) in Table 2 and Table 3, and the compactness corresponding to a relative density of more than 97% was achieved. These additively-manufactured articles achieved an electrical conductivity higher than 43% IACS, preferably higher than 45% IACS. Further, they also had a tensile strength of approximately 226 MPa or more, which is equal to or more than the tensile strength of an ingot of oxygen-free copper. It has therefore been found that the copper alloy powder containing 0.81 mass % of aluminum is also an excellent copper alloy powder that enables both an adequate electrical conductivity and an adequate mechanical strength of the additively-manufactured article to be achieved.

3-3-4. Al=1.3 Mass % (Metal Powder E4)

Following the additive manufacturing step (S20) in the flow shown in FIG. 1, the first step (S21) of forming a powder layer including the metal powder, and the second step (S22) of forming a shaped layer by applying a laser beam at a predetermined position in the powder layer to thereby solidify the metal powder were successively repeated. Accordingly, additively-manufactured articles of No. E4-1 to No. E4-6 were produced from the copper alloy powder (metal powder E4) containing 1.3 mass % of aluminum.

Conditions for producing each additively-manufactured article, as well as respective numerical values of the relative density, the tensile strength, and the electrical conductivity of the additively-manufactured article measured in accordance with the above-described methods are shown in Table 8. Further, for No. E4-7 and No. E4-8, dumbbell-shaped test specimens 20 shown in FIG. 8 were separately produced as additively-manufactured articles, and the tensile strength was measured for the test specimens.

TABLE 8

Al-Containing Cu Alloy (Al = 1.3 mass %)

| | production method | | | additively-manufactured article | | |
|---|---|---|---|---|---|---|
| | 1st step powder | 2nd step laser irradiation conditions | | | | |
| No. | layer metal powder | scanning velocity mm/s | energy density J/mm³ | relative density % | tensile strength MPa | electrical conductivity % IACS |
| E4-1 | E4 | 200 | 587.3 | 98.207 | — | 34.97 |
| E4-2 | E4 | 200 | 587.3 | 97.360 | — | 35.09 |
| E4-3 | E4 | 200 | 587.3 | 98.049 | — | 35.09 |
| E4-4 | E4 | 300 | 391.5 | 97.913 | — | 35.70 |
| E4-5 | E4 | 300 | 391.5 | 98.477 | — | 35.58 |
| E4-6 | E4 | 300 | 391.5 | 98.274 | — | 35.58 |
| E4-7 | E4 | 200 | 587.3 | — | 245.3 | — |
| E4-8 | E4 | 300 | 391.5 | — | 241.7 | — |

As seen from Table 8, regarding the additively-manufactured articles produced from the copper alloy powder (metal powder E4) containing 1.3 mass % of aluminum, variation between the additively-manufactured articles in terms of final physical properties was reduced relative to the additively-manufactured articles produced from the pure copper powder (metal powder X) in Table 2 and Table 3, and the compactness corresponding to a relative density of more than 97% was achieved. These additively-manufactured articles achieved an electrical conductivity higher than 34% IACS, preferably higher than 35% IACS. Further, they also had a tensile strength of approximately 241 MPa or more, which is equal to or more than the tensile strength of an ingot of oxygen-free copper. It has therefore been found that the copper alloy powder containing 1.3 mass % of aluminum is also an excellent copper alloy powder that enables both an adequate electrical conductivity and an adequate mechanical strength of the additively-manufactured article to be achieved.

It should be noted that in the case of a copper alloy powder containing less than 0.2 mass % of aluminum, the properties of the copper alloy powder are close to the properties of pure copper powder. Therefore, an additively-manufactured article produced from this copper alloy powder has many voids, exhibits a mechanical strength determined by the density and the tensile strength which are both significantly lower than those of an ingot of pure copper, and exhibits an electrical conductivity which is also significantly lower than that of an ingot of pure copper. In the case of a copper alloy powder containing more than 1.3 mass % of aluminum, there is a possibility that an electrical conductivity of 30% IACS or more cannot be ensured. Accordingly, when a copper alloy powder (metal powder) containing: not less than 0.2 mass % and not more than 1.3 mass % of aluminum; and a balance including copper and an incident impurity is prepared and an additively-manufactured article is produced from this copper alloy powder, the most preferred additively-manufactured article having both an adequate electrical conductivity and an adequate mechanical strength can be obtained.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A method of producing an additively-manufactured article, the method comprising:
   a first step of forming a powder layer of a metal powder consisting essentially of:
      not less than 0.2 mass % and not more than 1.3 mass % of aluminum; and
      a balance of copper and an incidental impurity; and
   a second step of forming a shaped layer by solidifying the metal powder at a predetermined position in the powder layer,
   the first step and the second step being successively repeated to stack the shaped layers and produce an additively-manufactured article;
   wherein
   the metal powder is in the form of particles having an average particle size of not smaller than 100 μm and not more than 200 μm, and
   the aluminum is present in the copper alloy as a chemical element, and
   the method further comprising a heat treatment step of heat-treating the additively-manufactured article, wherein
   a heat treatment temperature in the heat treatment step is not less than 300° C. and not more than 400° C.

2. The method of producing an additively-manufactured article according to claim 1, wherein the copper alloy consists of:
   not less than 0.2 mass % and not more than 1.3 mass % of aluminum; and
   a balance including copper and an incidental impurity.

* * * * *

UNITED STATES PATENT AND TRADEMARK OFFICE
CERTIFICATE OF CORRECTION

| | | |
|---|---|---|
| PATENT NO. | : 11,185,924 B2 | Page 1 of 1 |
| APPLICATION NO. | : 16/268691 | |
| DATED | : November 30, 2021 | |
| INVENTOR(S) | : Ryusuke Tsubota et al. | |

It is certified that error appears in the above-identified patent and that said Letters Patent is hereby corrected as shown below:

On the Title Page (73) Assignees; delete "FUKUDA METAL FOIL & POWDER CO., ,LTD., Osaka (JP)" and insert
-- FUKUDA METAL FOIL & POWDER CO., ,LTD., Kyoto (JP) --

Signed and Sealed this
Eighth Day of March, 2022

Drew Hirshfeld
*Performing the Functions and Duties of the*
*Under Secretary of Commerce for Intellectual Property and*
*Director of the United States Patent and Trademark Office*